Patented Aug. 29, 1950

2,520,400

UNITED STATES PATENT OFFICE 2,520,400

PRODUCTION OF SULFENAMIDES

Chester M. Himel and Lee O. Edmonds, Bartlesville, Okla., assignors to Phillips Petroleum Company, a corporation of Delaware No Drawing. Application November 3, 1947, Serial No. 783,854

10 Claims. (Cl. 260—293.4)

This invention relates to the production of sulfenamides. More specifically it relates to the synthesis of sulfenamides from sulfenyl halides and amines.

In the copending application of one of us, Serial No. 617,871, filed September 21, 1945, a process is described wherein sulfenyl halides are reacted with amines under anhydrous conditions to produce the corresponding sulfenamides. While the method disclosed in that application has numerous advantages, certain difficulties arise when operating in this manner. The reaction between a sulfenyl halide and an amine evolves free halogen acid which in turn reacts with unchanged amine to form an amine hydrohalide with which the sulfenyl halide does not react. Thus for each molecule of sulfenamide formed one molecule of amine is changed to the inactive hydrohalide and, in order to effect the complete utilization of the sulfenyl halide, two mols of amine must be supplied to the reaction for each mol converted to sulfenamide. Separation and recovery of the unreacted amine from the reaction effluent involves added equipment and operational costs. Furthermore, when operating in this manner precipitation of the amine hydrohalide renders the reaction mixture highly viscous and efficient agitation of the system requires excessive expenditure of energy and extreme dilution. Thus incomplete reaction, local overheating, added solvent recovery costs, and the like are often encountered.

The principal object of the present invention is to provide an improved method for the production of sulfenamides. Another object is to provide such a method which overcomes the drawbacks of the method described in copending application Serial No. 617,871. Another object is to provide an improved synthesis of sulfenamides from sulfenyl halides and amines. Numerous other objects will more fully hereinafter appear.

We have now found that by conducting the reaction between a sulfenyl halide and an amine in the presence of an aqueous solution of an alkaline material, the aforementioned difficulties are overcome and highly efficient yields of the corresponding sulfenamide can be realized. By the method of our invention the halogen acid is neutralized by the alkaline solution thus permitting complete utilization of the amine in the reaction with the sulfenyl halide.

The highly reactive nature of sulfenyl halides with water is well known and the failure of any process in which they are brought into contact with aqueous solution would appear to be obvious. However, we have found that when the sulfenyl halide is dissolved in a suitable solvent and contacted with an amine in the presence of an aqueous solution of an alkaline material, the reaction between the sulfenyl halide and the amine proceeds preferentially to that between the sulfenyl halide and water, a wholly unpredictable result. The mechanism by which this preferential reaction takes place is not entirely clear but may involve a more rapid reaction between sulfenyl halide and amine than between sulfenyl halide and water.

When operating according to the method of our invention no excess of amine is required, the reaction proceeding to a high degree of conversion of sulfenyl halide and amine when the starting materials are supplied on a mol for mol basis. Thus laborious separation and purification processes for the recovery of unchanged amine and isolation of high quality product are substantially eliminated. Furthermore, the extremely viscous solutions encountered when operating by previous methods are avoided, adequate agitation is facilitated, and attendant difficulties are obviated.

The sulfenyl halides employed in our process may be alkyl, aryl, or aralkyl and include chlorides, bromides, and iodides. They may be obtained from any convenient source or may be prepared as used. A very efficient method of producing tertiary alkyl sulfenyl halides is described and claimed in copending application Serial No. 617,871 mentioned above, but our invention may also be practiced with the use of primary and secondary alkyl sulfenyl halides. The sulfenyl halide used in practicing the present invention is dissolved in a suitable solvent before contacting with the amine and alkaline solution.

The solvent employed for dissolving the sulfenyl halide will preferably be a paraffin hydrocarbon such as, for example, normal pentane, or a mixture of paraffin hydrocarbons since these materials are readily available at low cost. However, when desired diethyl ether, chloroform, methylene chloride, benzene or other suitable organic solvent which is substantially inert in the reaction may be employed. It is convenient to employ a solvent which boils at a relatively low temperature, say between 25 and 50° C. and to carry out the reaction in the refluxing solvent. By so operating the reaction temperature can be maintained at a convenient level and a certain degree of agitation of the system is automatically provided. If desired mechanical means for agitating the system so as to maintain intimate admixture of the solvent phase and the aqueous phase may be provided. In any case, it is essential that the solvent selected be free from appreciable amounts of sulfur or sulfur compounds, oxygen compounds, nitrogen compounds, unsaturated hydrocarbons, or any other impurities which would objectionably interfere with the reaction or contaminate the product. The amines employed may be either primary or secondary. The substituents attached to the nitrogen of the amine may be the same or different and include alkyl or aralkyl groups. Alkylaryl amines are likewise applicable. Examples are methyl aniline, benzylamine, aliphatic amines such as methyl, ethyl, propyl, butyl and higher amines, dimethyl, diethyl, dipropyl, dibutyl and higher dialkyl amines, mixed amines such as methylethylamine, etc. Heterocyclic amines which are secondary rather than tertiary may also be employed. Thus, morpholine is highly applicable to our process while pyridine cannot be used. Another heterocyclic amine which may be employed is piperidine. Cycloalkyl amines such as for example cyclohexyl amine may be employed.

The amine employed in practicing the present invention may be soluble or insoluble in water with equally satisfactory results. One of the advantages of our invention lies in the fact that the amine need not be anhydrous. Since the reaction is effected in the presence of an aqueous solution, amines with which dehydration would be expensive or impractical can be readily employed, thus greatly extending the usefulness of the sulfenyl halide reagent and increasing the number of sulfenamides readily made available.

Conditions of temperature and pressure for effecting the synthesis of sulfenamides by the present process are, in general, not highly critical. The reaction proceeds smoothly at atmospheric pressure and room temperature. However, when desired, pressures either above or below atmospheric may be employed and temperatures in the range between 0 and 65° C. or even beyond these limits are applicable.

The success of the synthesis in certain cases, particularly when operating with primary and secondary alkyl sulfenyl halides, is markedly dependent upon the order of addition of reactants. For example, an amine-caustic solution added to a pentane solution of ethyl sulfenyl chloride gives a complex mixture of products and a very low yield of the corresponding sulfenamide. By reversing the procedure, that is, by adding the sulfenyl chloride solution to the amine-caustic solution, yields as high as 93 per cent or more can be realized.

It is preferred to employ substantially equally molar proportions of the sulfenyl halide and the amine. For example the molar ratio of the sulfenyl halide to the amine preferably ranges from 0.75:1 to 1.25:1. Employment of substantially stoichiometric equivalents of the sulfenyl halide and the amine is highly advantageous because it obviates the necessity of recovering large amounts of unreacted sulfenyl halide or amine from the reaction mixture and thereby greatly reduces the cost of production of the sulfenamides.

It is preferred to employ the alkaline material in an amount sufficient to neutralize all of the hydrogen halide formed by the reaction between the sulfenyl halide and the amine. The amount of alkaline material required for this purpose would be at least stoichiometrically equivalent to whichever of the sulfenyl halide or the amine is present in lesser mol proportion. In other words, if a slight molar excess of the sulfenyl halide over the amine is employed, the amount of hydrogen halide liberated by the reaction would be at a maximum not more than that molecularly equivalent to the amine. Generally speaking we employ equimolar proportions of sulfenyl halide, amine and alkaline material.

The alkaline material employed in the practice of the present invention is preferably sodium hydroxide which is preferred because of its cheapness and ready availability. However, the process of the present invention operates equally well with hydroxides and carbonates of such alkali metals as sodium, potassium, or lithium and with oxides, hydroxides, and carbonates of other metals such as the alkaline earth metals.

The concentration of the alkaline material in the aqueous solution thereof employed in the practice of the present invention may vary over wide limits but generally ranges from 10 per cent by weight up to 30 per cent by weight. However, concentrations outside of this range may be employed if desired.

The process of the present invention is usually carried out in the following manner. A solution of the sulfenyl halide in the inert organic solvent which is capable of forming a separate phase in the reaction mixture and which preferably boils between 25 and 50° C. is commingled with the amine and with the aqueous solution of the alkaline material. The resulting reaction mixture is heated at substantially atmospheric pressure to a temperature at which refluxing of the solvent occurs. The reaction mixture is maintained under these conditions until the reaction between the sulfenyl halide and the amine to form the sulfenamide is substantially complete. The resulting mixture is then allowed to separate into an organic layer and an aqueous layer. The product sulfenamide is in the organic layer which is separated from the aqueous layer and treated in any suitable manner to recover the sulfenamide therefrom.

Following are examples illustrating the practice of the present invention. It is to be distinctly understood, however, that these examples are illustrative only and are non-limiting.

*Example I*

One hundred eighty-six grams of tert-butyl sulfenyl chloride was dissolved in 1600 cc. of n-pentane and added to a stirred reaction mixture of 128 grams of piperidine, 200 cc. pentane and 250 cc. of a 20 per cent aqueous solution of sodium hydroxide. After an hour the solvent was removed by distillation and the product distilled in vacuo. A yield of 254 grams of N-tert-butyl sulfenyl piperidine, boiling at 55 to 56° C. at 4.5 mm., $N_D^{20}$ 1.4765, was obtained, a yield of 98 per cent of theory.

*Example II*

The experiment of Example I was repeated using 124 grams of tert-butyl sulfenyl chloride in 1600 cc. of n-pentane which was added to 99 grams of cyclohexyl amine in 170 cc. of a 20 per cent aqueous solution of sodium hydroxide. After separation and drying a yield of 149 grams of N-cyclohexyl tert-butyl sulfenamide, B. P. 57 to 58° C. at 1 mm. mercury absolute pressure, $N_D^{20}$ 1.4870, was obtained.

Example III

The experiment of Example I was repeated using 110.5 grams of isopropyl sulfenyl chloride in 1600 ml. of isopentane. To this solution was added 85 grams of piperidine in 160 ml. of 20 per cent sodium hydroxide. After separation and drying a yield of 147 grams (97 per cent of theory) of isopropyl sulfenyl piperidine was obtained.

Example IV

The experiment of Example I was repeated using 96.5 grams of ethylsulfenyl chloride in 1500 ml. of isopentane and 85 grams of piperidine in 160 ml. of 20 per cent sodium hydroxide. The ethylsulfenyl chloride solution was added to the amine and alkali solution with vigorous stirring. After separation and drying a yield of 135 grams (93 per cent) of ethyl sulfenyl piperidine was obtained.

We claim:

1. The process of synthesizing a sulfenamide which comprises contacting an alkyl sulfenyl halide in an inert organic solvent that forms a separate phase in the reaction mixture with an amine selected from the group consisting of primary and secondary amines in the presence of an aqueous solution of an alkaline material in an intimate admixture of solvent phase and aqueous phase and thereby effecting reaction between said sulfenyl halide and said amine to form a sulfenamide.

2. A process according to claim 1 wherein the molar ratio of sulfenyl halide to amine is within the range of 0.75:1 to 1.25:1.

3. A process according to claim 1 wherein the alkaline material is an alkali metal hydroxide having a concentration within the range of 10 to 30 per cent by weight and wherein said alkali metal hydroxide is present in an amount sufficient to neutralize all of the hydrogen halide formed during the reaction whereby said sulfenamide is prepared free of amine hydrohalide.

4. A process according to claim 1 wherein the sulfenyl halide is added to the solution containing the amine.

5. A process according to claim 1 wherein the reaction temperature is maintained between 0 and 65° C.

6. The process of synthesizing an alkyl sulfenamide which comprises commingling in an intimate admixture a solution of an alkyl sulfenyl chloride in an organic solvent which is inert in the reaction and which forms a separate phase in the reaction mixture and which boils between 25 and 50° C. with an amine, the molar ratio of said alkyl sulfenyl chloride to said amine ranging from 0.75:1 to 1.25:1, and with an aqueous solution of an alkaline material in amount sufficient to neutralize all of the hydrogen halide liberated by reaction between the sulfenyl chloride and the amine, heating the reaction mixture at atmospheric pressure to a temperature at which refluxing of said solvent occurs and holding under these conditions until reaction between said alkyl sulfenyl chloride and said amine to form said alkyl sulfenamide is complete, and recovering said alkyl sulfenamide from the reaction mixture.

7. The process of synthesizing N-tert-butyl sulfenyl piperidine which comprises commingling in an intimate admixture a solution of tert-butyl sulfenyl chloride in n-pentane with piperidine in amount stoichiometrically equivalent to the amount of said sulfenyl chloride and with an aqueous solution of sodium hydroxide in amount such that sodium hydroxide is present in quantity sufficient to combine with all of the hydrogen chloride liberated by the reaction between said tert-butyl sulfenyl chloride and said amine, holding the resulting reaction mixture at atmospheric pressure and at an elevated temperature at which the said n-pentane is refluxed for one hour, separating the resulting reaction mixture into an n-pentane layer and an aqueous layer, separating said n-pentane layer and recovering the N-tert-butyl sulfenyl piperidine therefrom.

8. The process of synthesizing a sulfenamide which comprises contacting an alkyl sulfenyl halide in an inert organic solvent that forms a separate phase in the reaction mixture with an amine selected from the group consisting of primary and secondary amines in the presence of an aqueous solution of an alkaline material in an intimate admixture of solvent phase and aqueous phase and employing equimolar proportions of sulfenyl halide, amine and alkaline material and thereby effecting reaction between said sulfenyl halide and said amine to form a sulfenamide.

9. A process according to claim 8 wherein the sulfenyl halide is isopropyl sulfenyl chloride, the amine is piperidine and the sulfenamide is isopropyl sulfenyl piperidine.

10. A process according to claim 8 wherein the sulfenyl halide is ethylsulfenyl chloride, the amine is piperidine and the sulfenamide is ethylsulfenyl piperidine.

CHESTER M. HIMEL.
LEE O. EDMONDS.

REFERENCES CITED

The following references are of record in the file of this patent:

UNITED STATES PATENTS

| Number | Name | Date |
|---|---|---|
| Re. 19,286 | Zaucker et al. | Aug. 21, 1934 |
| 1,832,328 | Scott | Nov. 19, 1931 |
| 2,045,888 | Tschunkur et al. | June 30, 1936 |
| 2,123,082 | Schulze | July 5, 1938 |
| 2,343,538 | Ebelke | Mar. 7, 1944 |
| 2,417,954 | Sloan | Mar. 25, 1947 |

FOREIGN PATENTS

| Number | Country | Date |
|---|---|---|
| 586,351 | Germany | Oct. 20, 1933 |

OTHER REFERENCES

Rheinboldt et al.: Ber. der Deu. Chem. 72, pp. 659, 663, 664, and 668 (1939).